United States Patent [19]

Katayama

[11] Patent Number: 4,909,155
[45] Date of Patent: Mar. 20, 1990

[54] AUTO BODY HOLDING MEANS FOR AUTO BODY CONVEYOR APPARATUS WITH SIDE SILL HOLDING MEANS THAT ACCEPTS DIFFERENT SIZED SIDE SILLS

[75] Inventor: Shinji Katayama, Hiroshima, Japan

[73] Assignee: Mazda Motor Manufacturing (U.S.A.) Corporation, Flat Rock, Mich.

[21] Appl. No.: 239,614

[22] Filed: Aug. 31, 1988

[51] Int. Cl.[4] .......................... B61B 10/02; B61B 3/00
[52] U.S. Cl. ...................................... 105/148; 104/89
[58] Field of Search ............................ 104/89, 93, 94; 105/148, 150, 149; 294/904; 198/678, 486.1, 465.4

[56] References Cited

U.S. PATENT DOCUMENTS 3,926,125 12/1975 Orwin ..................................... 104/94
4,464,998 8/1984 Wakabayashi ....................... 105/148

FOREIGN PATENT DOCUMENTS 0021347 2/1980 Japan ................................... 105/148
0101509 8/1980 Japan ................................... 105/148
59-27979 2/1984 Japan .

Primary Examiner—Robert J. Oberleitner
Attorney, Agent, or Firm—Wenderoth, Lind & Ponack

[57] ABSTRACT

An auto body side sill holding apparatus for an auto body conveyor apparatus wherein spaced pairs of hanger arms are pivotally mounted on a frame on opposite sides of the line along which the conveyor apparatus is conveying the auto bodies for pivoting movement about the upper ends of the hanger arms for moving the lower ends of the hanger arms away from and toward an auto body. The auto body side sill holding apparatus includes a first side sill holding support on the lower ends of the hanger arms on one side of the line for holding one side sill of an auto body in a fixed position laterally of the direction of movement of the conveyor apparatus and a second side sill holding support on the lower ends of the hanger arms on the other side of the line for supporting the other side sill of an auto body and for permitting movement thereof laterally of the direction of movement of the conveyor apparatus. The first side sill holding support has a V-shaped groove therein in which one side sill of the auto body is received for substantially preventing lateral movement of the side sill in a direction transverse of the line and the second side sill holding support has a flat surface on which the side sill on the other side of the auto body is free to move laterally.

4 Claims, 3 Drawing Sheets

AUTO BODY HOLDING MEANS FOR AUTO BODY CONVEYOR APPARATUS WITH SIDE SILL HOLDING MEANS THAT ACCEPTS DIFFERENT SIZED SIDE SILLS

The present invention relates to an improved auto body holding means for an auto body conveyor apparatus, and more particularly to such an improved holding means which will hold the auto body on the conveyor apparatus in a precise predetermined position for being operated on by robots and the like.

BACKGROUND OF THE INVENTION

Auto body conveyor apparatus has been known for many years, and a typical such apparatus is disclosed in U.S. Pat. No. 3,926,125 to Orwin, and has an auto body supporting frame 19 which is moved along a conveyor beam means 10 on a trolley 15. The hanger frame has spaced pairs of hanger arms depending therefrom on opposite sides of the hanger frame, and these are pivotable outwardly from the line along which the auto body 20 is conveyed.

A typical means for supporting the auto body on such a conveyor apparatus is shown in U.S. Pat. No. 4,464,998 to Wakabayashi, and consists of inwardly extending article support members 29 on which the lower edges of the auto body rest. As will be understood, because the lower edges of the auto body simply rest on the flat surfaces, there is nothing which precisely positions the auto body on the article support members 29, and the auto body is free to shift under forces which are exerted on it during the conveyance thereof along the conveyor apparatus.

This problem has been recognized, and Published Japanese Application No. 59-27979 of Feb. 21, 1984, proposes a solution to this problem. In this publication, there is provided article support members 19 each of which have a series of V-shaped notches 25 spaced inwardly from the lower end of the hanger arm 17, 18 and the side sill 27 along the bottom edge of the auto body 26 engages in the V-shaped notches in the hangers on the opposite sides of the line along which the conveyor apparatus moves, thus holding the auto body against lateral movement transverse to the line of the conveyor.

However, while this construction provides some improvement in the positioning of the auto body, because the hanger arms and the hanger frames tend to be distorted slightly because of stresses exerted on them during normal use, the position of the support members 19 can change slightly, and also the dimension between the side sills on the opposite sides of the auto body can change slightly from auto body to auto body. This will result in the side sill on one side of the body engaging in the bottom of a V-shaped notch, while the sill on the other side may ride up the side of the V of the notch somewhat. This tends to tilt the body somewhat, and also it does not always occur on the same side of the body, so that one body may be shifted slightly to one side of the conveyor line and the next body might be shifted to the opposite side.

For many purposes, this lack of precision in the position of the auto body is not significant, but where robots are employed to perform operations on the auto body, such lack of precision in the positioning of the auto body makes the positioning and functioning of the robots so that they engage the auto body in the proper position extremely difficult.

OBJECT AND BRIEF SUMMARY OF THE INVENTION

It is an object of the invention to provide means on the hanger frame for conveying an auto body along a conveyor apparatus which will always position the auto body in the same position relative to the hanger frame.

It is a further object of the invention to provide such means which can be easily incorporated into existing hanger frames at low cost.

To this end, the present invention provides a first auto body side sill holding means on the lower end of a hanger arm of a hanger frame on one side of the line along which the conveyor runs for holding the side sill of an auto body in a fixed position laterally of the direction of movement of the conveyor apparatus, and a second side sill holding means on the lower ends of the hanger arms on the other side of the line along which the conveyor moves for supporting the side sill of the auto body on that side for permitting movement thereof laterally of the direction of movement of the conveyor apparatus.

Other objects and advantages of the invention will become obvious from the following description thereof, taken together with the accompanying drawings.

DETAILED DESCRIPTION OF THE INVENTION

Figure 1:
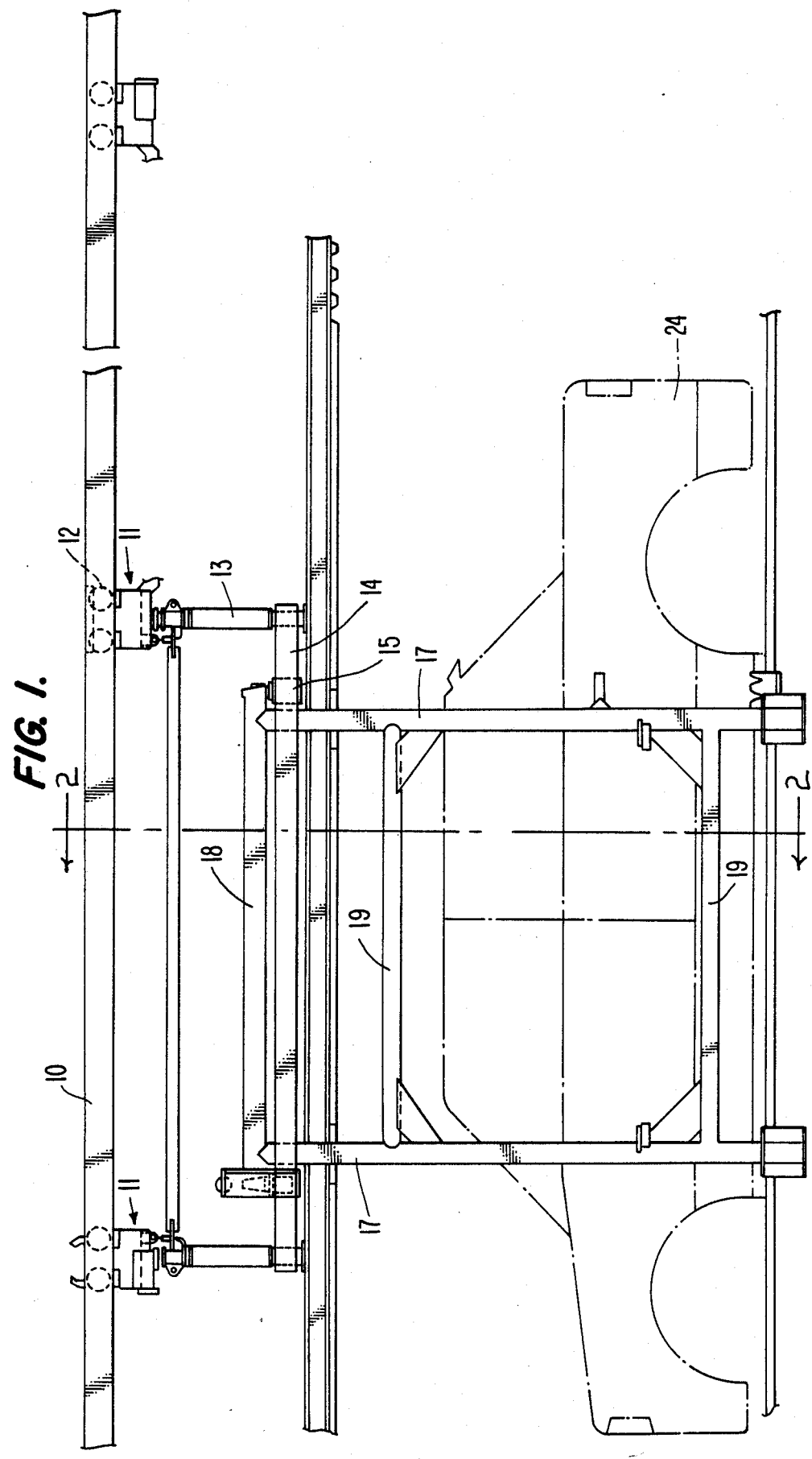
FIG. 1 is a side elevation view of a portion of an auto body conveyor apparatus on which the improved auto body holding means is provided.

Referring to the figures, the auto body conveyor apparatus on which the improved auto body side sill holding means of the present invention is provided is constituted by a conveyor beam means 10, which can be a pair of U-shaped beams with their openings opposed to each other, for supporting a conveyor trolley 11 having wheels 12 which roll along the flanges of the opposed conveyor beam means 10. A pair of trolleys 11 spaced in the direction of the length of the conveyor beam means 10 is provided, and hanger supports 13 depend from the respective trolleys and are connected by hanger frame members 14. On spaced transverse beams 15 mounted on the hanger frame members 14 are mounted pairs of hanger arm pivots 16 on which are pivoted respective hanger arm shafts 18, from which depend pairs of hanger arms 17. A forward hanger arm 17 and a rearward hanger arm 17 are mounted on each shaft, and a pair of braces 19 extend between the forward and rearward hanger arms 17 to form the hanger arms into a hanger arm frame. Such a hanger arm frame is provided on each side of the line along which the conveyor moves. The lower ends of the hanger arms on opposite sides of the line are opposed to each other to form a pair of hanger arm ends which move away from and toward each other as the hanger arm frames are pivoted on the hanger arm shaft 18. Auto body supporting members 17a are provided on the lower ends of hanger arm 17 and extend inwardly therefrom.

The means for pivoting the hanger arms is a hanger arm actuating arm or arms 20 connected to the respective hanger arm shafts 18, and projecting laterally for engagement with hanger arm cams 21 positioned along the path of the conveyor where it is desired to have the hanger arms pivoted outwardly away from each other.

Figure 2:
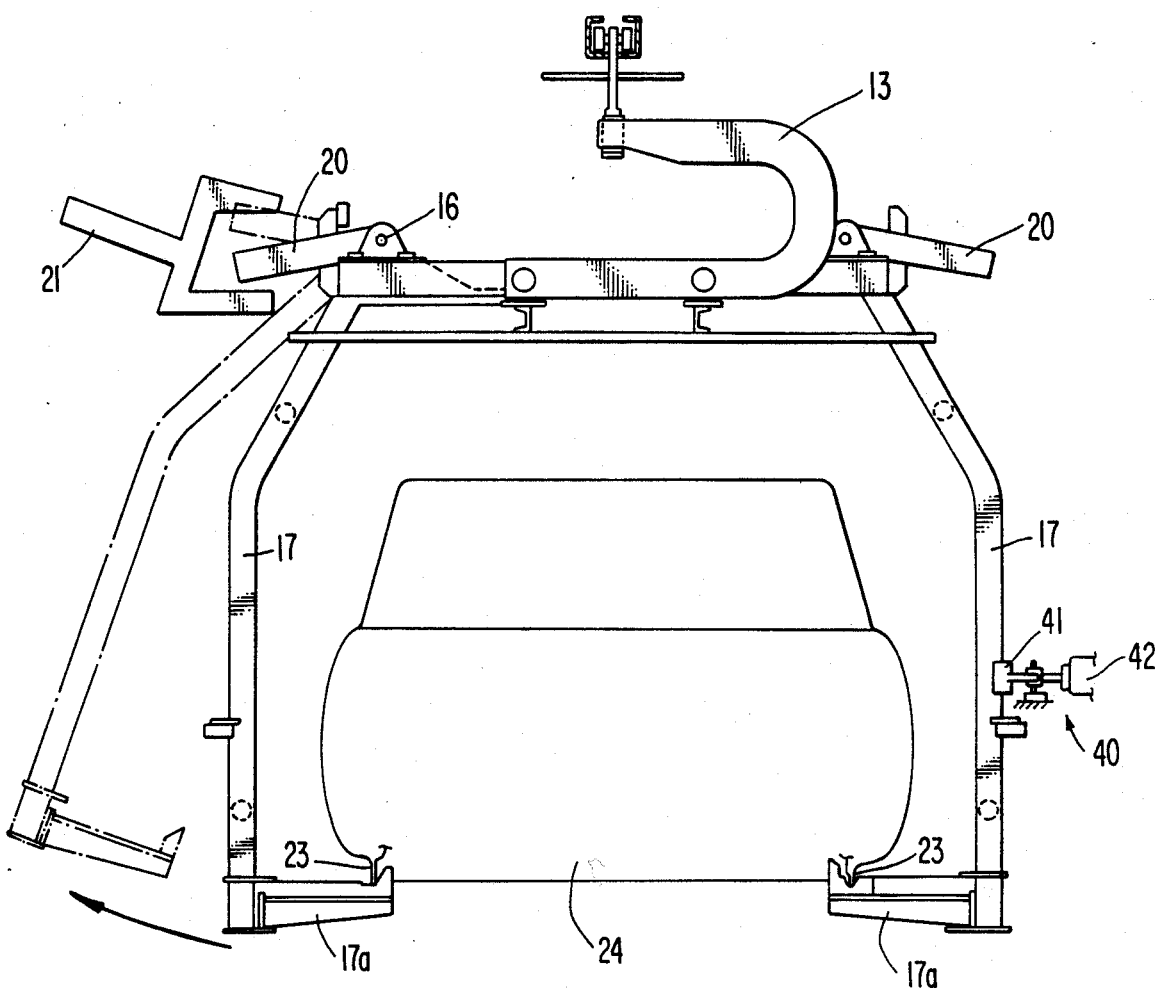
FIG. 2 is an end elevation view taken along line 2—2 of FIG. 1.

With the hanger arms in the positions where they are moved toward each other, as shown in full lines in FIG. 2, the lower auto body side sills 23 on the lower edges of the auto body 24, shown generally in phantom lines in FIG. 1, rest on the improved auto body holding means constituted by auto body side sill holding means.

Figure 4:
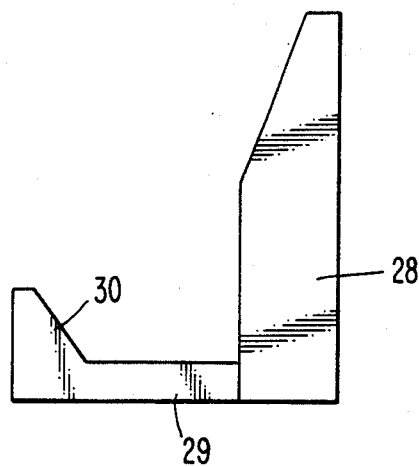
FIG. 4 is an elevation view of the auto body holding means on the hanger on the other side of the line.
Figure 3:
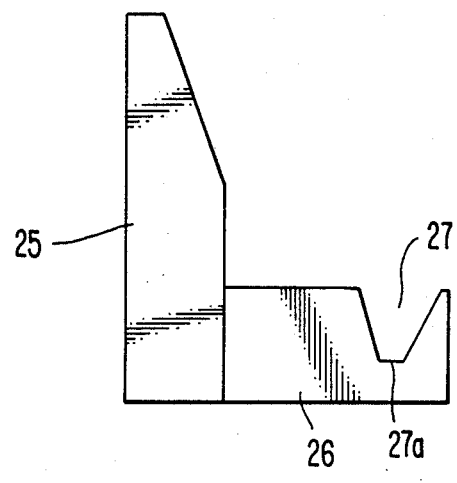
FIG. 3 is an enlarged elevation view of the improved auto body holding means on the hanger on one side of the line along which the conveyor moves.

The improved auto body side sill holding means are shown in FIGS. 3 and 4. In FIG. 3 there is shown a first side sill holding means which is constituted by an upright member 25 which is positioned inwardly of the respective auto body side sill 23 and a base member 26 which rests on the supporting member 17a extending inwardly from the lower end of the respective hanger arms on one side of the conveyor line, the right-hand side as viewed in FIG. 2. The base member 26 has a V-shaped notch or groove 27 therein which has a slightly flattened bottom 27a. As shown in FIG. 2, when the auto body side sill 23 engages in the groove, it is in a fixed position relative to the holding means, and, since the holding means is firmly attached to the support member 17a, the side sill and therefore the auto body is in a fixed position relative to the overall hanger arm frame structure of the conveyor. The auto body side sill 23 is held against lateral movement by the engagement of the edge of the sill 23 in the flat bottom of the V-shaped groove.

Clamp means 40 is provided along one side of the conveyor path for preventing pivotal movement of the hanger arms 17 supporting the base members 26 having the V-shaped grooves 27 therein. The clamp means 40 can comprise a pair of V-shaped clamping members 41, each of which is movable by hydraulically actuated means 42 through suitable linkage to a position at which the clamping member 41 engages a respective hanger arm 17 to prevent pivotal movement thereof. Thus, the first side sill holding means can be held firmly in a desired lateral position by the clamp means 40.

On the support member 17a on the hanger on the opposite side of the line is provided a second side sill holding means which also has an upright member 28 which is positioned inwardly of the respective auto body side sill 23 and a base member 29. On the end of the base member 29 which projects outwardly away from the center of the conveyor is a projection 30, and the outside face 31 thereof, which faces toward the line along which the conveyor runs, is angled downwardly and inwardly of the conveyor.

As can be seen from FIG. 2, while the side sill 23 on the right hand side of the auto body is fixed firmly against lateral movement relative to the hanger arm frame, the side sill 23 on the left side of the auto body rests simply on the flat upper surface of the base member 29, and can take a position anywhere along this flat surface depending upon the dimension between the side sills and the distance between the two holding means.

If one auto body is slightly wider than the preceding auto body, the side sill 23 on the left side thereof will be positioned slightly to the left of the position for the preceding auto body. Further, if the hanger arm frame has become slightly distorted for some reason, the side sill 23 on the left side of the auto body is free to rest anywhere along the flat surface of the base member so as to accommodate the distortion. The bottom edges of the side sills 23 will both be at the same level, i.e. one in the bottom of the V-shaped groove, and the other on the upper surface of the base member 29, which are both at the same level, so that the auto body will not be tilted. Further, because the side sill on the right side of the auto body is always held at a position exactly the same distance from the hanger arm 17 on that side of the conveyor, the auto body will always be precisely positioned relative to the hanger arm frame along the conveyor apparatus. Thus, robots and the like which operate on the auto body will be controllable to move to exactly the same positions for each of the auto bodies to perform the work thereon in precisely the same locations for each auto body.

It will thus be seen that, by this simple construction of the side sill holding means on the lower ends of the hanger arms, the problems of misaligned positioning and tilting of the auto body in the prior art apparatus have been overcome, and yet the holding means can be installed on existing conveyor lines simply by removing the prior art holding means and replacing them with the holding means of the present invention. The invention thus has the potential for wide use in existing conveyor lines without the necessity for extensive and expensive reconstruction thereof.

What is claimed is:

1. In an auto body conveyor apparatus having a hanger means constituted by a frame conveyed along a conveyor beam means and having spaced pairs of hanger arms having upper and lower ends, said hanger arms being pivotally mounted on the frame on opposite sides of a line along which the conveyor apparatus is conveying auto bodies for pivoting movement about said upper ends of the hanger arms for moving said lower ends of the hanger arms away from and toward an auto body supported on said hanger means, an improved auto body side sill holding means, comprising:

a first side sill holding means on said lower ends of said hanger arms on said hanger means on one side of said line for holding an associated side sill of an auto body in a fixed position laterally of the direction of movement of the conveyor apparatus; and a second side sill holding means mounted in a fixed position on said lower end of said hanger arms on said hanger means on the other side of said line and having a surface thereon for supporting an associated side sill of an auto body at the same level as the level at which said first mentioned side sill is supported and at all points along said surface in a direction laterally of the direction of movement of the conveyor apparatus.

2. An improved auto body side sill holding means as claimed in claim 1 in which said first side sill holding means comprises a side sill support element having a V-shaped groove therein in which the side sill of an auto body is received for substantially preventing lateral movement of the side sill in a direction transverse of said line, and said second side sill holding means comprises a side sill support element having an upwardly extending projection on the end thereof facing away from said line and said surface is constituted by a substantially flat upper surface therealong extending from the projection inwardly of the line away from the lower end of the hanger arm on which it is carried.

3. An improved auto body side sill holding means as claimed in claim 2 in which the side of said projection facing inwardly of said line is angled downwardly and inwardly of said line.

4. An improved auto body side sill holding means as claimed in claim 2, further comprising clamp means for preventing pivotal movement of said hanger arms supporting said first side sill holding means.

* * * * *